(12) United States Patent
Senda (10) Patent No.: US 9,040,599 B2
(45) Date of Patent: May 26, 2015

(54) POLYPROPYLENE RESIN EXPANDED PARTICLES AND POLYPROPYLENE RESIN IN-MOLD FOAMING MOLDED BODY

(75) Inventor: Kenichi Senda, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 607 days.

(21) Appl. No.: 13/500,215

(22) PCT Filed: Sep. 28, 2010

(86) PCT No.: PCT/JP2010/005824
§ 371 (c)(1),
(2), (4) Date: Apr. 4, 2012

(87) PCT Pub. No.: WO2011/043032
PCT Pub. Date: Apr. 14, 2011

(65) Prior Publication Data
US 2012/0214890 A1  Aug. 23, 2012

(30) Foreign Application Priority Data
Oct. 6, 2009  (JP) ................................. 2009-232700

(51) Int. Cl.
| | | |
|---|---|---|
| *C08F 110/06* | (2006.01) | |
| *C08J 9/16* | (2006.01) | |
| *C08F 210/06* | (2006.01) | |
| *B29C 44/34* | (2006.01) | |
| *C08F 2/00* | (2006.01) | |
| *C08F 4/659* | (2006.01) | |
| *C08F 4/6592* | (2006.01) | |

(52) U.S. Cl.
CPC ........... *C08F 210/06* (2013.01); *C08F 4/65912* (2013.01); *C08F 4/65916* (2013.01); *C08F 4/65927* (2013.01); *B29C 44/3465* (2013.01); *C08F 2/001* (2013.01); *C08J 9/16* (2013.01); *C08J 2323/14* (2013.01); *C08F 4/659* (2013.01)

(58) Field of Classification Search
CPC ........ C08F 2/001; C08F 210/06; C08F 4/659; C08F 4/65912; C08F 4/65916; C08F 4/65927; C08J 9/16; C08J 2323/14
USPC ............................. 521/56, 59, 134, 139, 143
See application file for complete search history.

(56) References Cited

U.S. PATENT DOCUMENTS

| | | | |
|---|---|---|---|
| 4,908,393 A | 3/1990 | Arai et al. | |
| 5,032,620 A | 7/1991 | Arai et al. | |
| 6,469,188 B1 * | 10/2002 | Miller et al. | ................... 556/12 |
| 2008/0220193 A1 | 9/2008 | Tohi et al. | |
| 2010/0105787 A1 * | 4/2010 | Sasaki et al. | ................... 521/59 |
| 2010/0137466 A1 | 6/2010 | Sasaki et al. | |
| 2013/0310476 A1 | 11/2013 | Senda | |

FOREIGN PATENT DOCUMENTS

| | | | |
|---|---|---|---|
| CN | 101189269 A | | 5/2006 |
| EP | 1790683 A1 | | 5/2007 |
| JP | 1-242638 A | | 9/1989 |
| JP | 7-258445 A | | 10/1995 |
| JP | 2001-341151 A | | 12/2001 |
| JP | 2005-200450 A | | 7/2005 |
| JP | 2006-096805 A | | 4/2006 |
| WO | WO 2008/139822 A1 | | 11/2008 |
| WO | WO 2008/139833 A1 | | 11/2008 |
| WO | WO 2009/001626 A1 | | 12/2008 |
| WO | WO 2012/105608 A1 | | 8/2012 |

OTHER PUBLICATIONS

English translation of the International Preliminary Report on Patentability and Written Opinion issued May 18, 2012, in PCT International Application No. PCT/JP2010/005824.
Office Action issued Jul. 15, 2014, in Japanese Patent Application No. 2011-535271, with English translation.
Extended European Search Report for European Application No. 10821710.0, dated Apr. 9, 2014.

* cited by examiner

*Primary Examiner* — Irina S Zemel
(74) *Attorney, Agent, or Firm* — Birch, Stewart, Kolasch & Birch, LLP (57) ABSTRACT

Polypropylene resin expanded particles include polypropylene resin as base material resin having at least two melting peaks on a DSC curve, the at least two melting peaks including (i) a lowest-temperature melting peak of 100° C. or more but 130° C. or less and (ii) a highest-temperature melting peak of 140° C. or more but 160° C. or less, so that the expanded particles: produce an in-mold foaming molded product at a very low mold heating steam pressure; exhibit low distortion, low shrinkage, and a wide range of heating condition for molding, even if the mold heating steam pressure is increased; have satisfactory moldability when the expanded particles are molded by using a mold having a complicated shape or a large mold; and maintain properties such as compressive strength, substantially unimpaired, when the expanded particles make the in-mold foaming molded product.

12 Claims, 2 Drawing Sheets

POLYPROPYLENE RESIN EXPANDED PARTICLES AND POLYPROPYLENE RESIN IN-MOLD FOAMING MOLDED BODY

TECHNICAL FIELD

The present invention relates to polypropylene resin expanded particles. In particular, the present invention relates to polypropylene resin expanded particles which can be suitably used as a material of molded products produced by in-mold foaming molding, i.e., which can be molded at a low temperature and has a wide range of mold heating steam pressure.

BACKGROUND ART

An in-mold foaming molded product which is obtained by (i) introducing a polypropylene resin expanded particles into a mold and (ii) thermally molding the expanded particles with steam has characteristics such as freedom of shape, lightness in weight, and heat insulation efficiency which are advantages of the in-mold foaming molded product. The in-mold foaming molded product prepared from the polypropylene resin expanded particles is superior in chemical resistance, heat resistance, and a distortion recovery rate after compression, in comparison with polystyrene resin expanded particles. In addition, the in-mold foaming molded product prepared from the polypropylene resin expanded particles is superior in dimensional accuracy, heat resistance, and compressive strength in comparison with polyethylene resin expanded particles. Because of those characteristics, the in-mold foaming molded product prepared from the polypropylene resin expanded particles is variously used for heat insulators, buffer packaging materials, automobile interior part materials, core material for automobile bumpers, and the like.

However, in order to prepare the in-mold foaming molded product by fusing the polypropylene resin expanded particles with each other in a mold, it is necessary to heat the polypropylene resin expanded particles at a high temperature, i.e., under a high steam pressure in comparison with cases of the polystyrene resin expanded particles and the polyethylene resin expanded particles. Therefore, this method of preparing the in-mold foaming molded product has such disadvantages in that this method requires a mold and a molding machine tolerable against a high pressure, and high steam cost for molding.

Most of molding machines for in-mold foaming molding of the polypropylene resin expanded particles have an upper limit of pressure resistance of up to about 0.4 MPa·G (gauge pressure). The polypropylene resin expanded particles to be used for the in-mold foaming molding are prepared from a resin which can be molded under the pressure up to the upper limit of the pressure resistance of the molding machines. Generally, the polypropylene resin expanded particles made from a propylene random copolymer having a melting point of about 140° C. to 150° C. are used.

However, due to a recent steep rise in fuel price etc., there is a demand for molding an in-mold foaming molded product at a lower temperature, i.e., with a lower steam pressure. Further, in a case where the in-mold foaming molded product is prepared using a mold having a complicated shape or a large mold, there is a risk that the expanded particles are not fused well to each other in some parts in the molding. If the molding is performed with a higher mold heating steam pressure in order to perform the fusing sufficiently in such parts, the expanded particles tend to deform or shrink. Accordingly, it is desired that a range of mold heating steam pressure (also referred to as a range of heating condition) for molding is improved to be wider than a conventional one.

In order to solve the aforementioned problems, a propylene.1-butene random copolymer, a propylene.ethylene.1-butene random ternary copolymer, prepared by using a Ziegler polymerization catalyst, (Patent Literature 1 and Patent Literature 2), and a PP homopolymer or a propylene-ethylene random copolymer, prepared by using a metallocene polymerization catalyst, are proposed as a resin which has a low melting point and has a higher rigidity than other resins at the same melting point.

However, a propylene random copolymer containing a 1-butene comonomer, which is prepared by using a Ziegler polymerization catalyst, has a limit in reducing its melting point. In specific, melting points of commercially available propylene random copolymers are about 130° C. at lowest.

On the other hand, a propylene.ethylene random copolymer prepared by using a metallocene polymerization catalyst can be prepared to have a lower melting point, specifically, of 130° C. or less.

In order to achieve in-mold foaming molding at low heating temperature, Patent Literature 3 proposes that polypropylene resin expanded particles made from a polypropylene resin having a resin melting point of 115° C. to 135° C. and an Olsen flexural modulus of 500 MPa or higher. The resin used therein is prepared from partially a propylene.ethylene.1-butene random ternary copolymer and mainly a propylene-.ethylene.random copolymer prepared by using a metallocene polymerization catalyst. Melting points of the resin in Examples of Patent Literature 3 are in a range of 120° C. to 134° C. Considering this, the technique of Patent Literature 3 surely achieves the in-mold foaming molding at a low heating temperature. However, the technique of Patent Literature 3 should be improved in terms of a range of mold heating steam pressure allowing use of a high temperature.

As a technique for widening the range of mold heating steam pressure, Patent Literature 4 proposes polypropylene resin pre-expanded particles made from a mixture of two polypropylene resins having a melting point difference of 15° C. or more but 30° C. or less. However, it is necessary to mold the polypropylene resin pre-expanded particles at a mold heating temperature of 140° C. or more, that is, the pre-expanded particles cannot be said as being moldable at a low temperature.

Further, Patent Literature 5 proposes that polypropylene resin expanded particles having a crystal structure which indicate a main endothermic peak exhibiting an endothermic peak calorific value of 70 to 95% of the total endothermic peak calorific value and having an apex temperature of 100 to 140° C. and two or more endothermic peaks on the high-temperature sides of the main endothermic peak on the first DSC curve obtained when the polypropylene resin expanded particles are heated from normal temperature to 200° C. at a temperature rise rate of 2° C./min by heat flux differential scanning calorimeter. The polypropylene resin expanded particles are made from a mixture of (i) a propylene.ethylene random copolymer having a low melting point and being prepared by using a metallocene polymerization catalyst and (ii) a resin having a high melting point such as a propylene homopolymer and being prepared by using a Ziegler polymerization catalyst. Examples of Patent Literature 5 describe that a preferable in-mold foaming molded product can be prepared with a heating steam pressure less than 0.2 MPa·G, which pressure is lower than conventional polypropylene resin expanded particles. However, in Patent Literature 5, two component resins have an excessively large melting point difference therebetween, and therefore it is expected that the expanded particles tend to have a cell structure disturbed to have open-cell foams.

CITATION LIST

Patent Literature

Patent Literature 1
Japanese Patent Application Publication, Tokukaihei, No. 1-242638 A
Patent Literature 2
Japanese Patent Application Publication, Tokukaihei, No. 7-258455 A
Patent Literature 3
International Publication WO 2008/139833
Patent Literature 4
Japanese Patent Application Publication, Tokukai, No. 2006-96805 A
Patent Literature 5
International Publication WO 2009/001626

SUMMARY OF INVENTION

Technical Problem

One object of the present invention is to provide polypropylene resin expanded particles which (i) can produce an in-mold foaming molded product at a very low mold heating steam pressure, (ii) exhibit low distortion, low shrinkage, and a wide range of heating condition for molding, even if the mold heating steam pressure is increased, (iii) indicate a satisfactory moldability in a case where the expanded particles are molded using a mold having a complicated shape, a large mold, or the like, and (iv) maintain its properties such as compressive strength, without being impaired largely, in a case where the polypropylene resin expanded particles prepare the in-mold foaming molded product.

Solution to Problem

The inventor of the present invention has been studied diligently in order to solve the aforementioned object, and as a result, found that: by making polypropylene resin expanded particles from, as a base material resin, a polypropylene resin which had at least two melting peaks on a DSC curve obtained by the measurements of melting points with use of a differential scanning calorimeter (DSC), the at least two melting peaks including (i) a lowest-temperature melting peak of 100° C. or more but 130° C. or less and (ii) a highest-temperature melting peak of 140° C. or more but 160° C. or less, it was possible to obtain polypropylene resin expanded particles which (i) could produce an in-mold foaming molded product at a very low mold heating steam pressure, (ii) exhibited low distortion, low shrinkage, and a wide range of heating condition for molding, even if the mold heating steam pressure was increased, (iii) indicated a satisfactory moldability in a case where the expanded particles were molded using a mold having a complicated shape, a large mold, or the like, and (iv) maintain its properties such as compressive strength, without being impaired largely, in a case where the polypropylene resin expanded particles prepare a polypropylene resin in-mold foaming molded product. Thus the inventor achieved the present invention.

That is, the present invention is constituted by the followings.

[1] Polypropylene resin expanded particles includes: a polypropylene resin as a base material resin which has at least two melting peaks on a DSC curve obtained by measurements of melting points with use of a differential scanning calorimeter, the at least two melting peaks including (i) a lowest-temperature melting peak of 100° C. or more but 130° C. or less and (ii) a highest-temperature melting peak of 140° C. or more but 160° C. or less.

[2] The polypropylene resin expanded particles according to [1], wherein the polypropylene resin as the base material resin has at least three melting peaks on the DSC curve obtained by measurements of melting points with use of the differential scanning calorimeter, the at least three melting peaks including (i) the lowest-temperature melting peak of 100° C. or more but 130° C. or less, (ii) the highest-temperature melting peak of 140° C. or more but 160° C. or less, and (iii) a melting peak between the lowest-temperature melting peak and the highest-temperature melting peak.

[3] The polypropylene resin expanded particles as set forth in [1] or [2], wherein the lowest-temperature melting peak derived from a polypropylene resin polymerized by using a metallocene polymerization catalyst.

[4] The polypropylene resin expanded particles according to [3], wherein the lowest-temperature melting peak and the highest-temperature melting peak are derived from the polypropylene resin polymerized by using the metallocene polymerization catalyst.

[5] The polypropylene resin expanded particles according to [3] or [4], wherein the metallocene polymerization catalyst contains a metallocene compound represented by the following Formula 1:

(where $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ identically or independently one selected from the group consisting of a hydrogen atom, a hydrocarbon group, and a silicon-containing group; M represents a group-4 transition metal; Y represents a carbon atom or a silicon atom; Q is identically or independently one selected from the group consisting of a halogen atom, a hydrocarbon group, an anion ligand, and a neutral ligand coordinatable with a lone pair of electrons; and j is an integer of 1 to 4.)

[6] The polypropylene resin expanded particles according to any one [1] to [5], wherein the polypropylene resin expanded particles have at least two melting peaks on the DSC curve obtained in first measurement of temperature rise of the polypropylene resin expanded particles with use of a differential scanning calorimeter, the at least two melting peaks including (i) a lowest-temperature melting peak of 100° C. or more but 130° C. or less and (ii) a highest-temperature melting peak of 140° C. or more but 160° C. or less.

[7] The polypropylene resin expanded particles according to [6], wherein a difference between the temperature of the lowest-temperature melting peak and the temperature of the highest-temperature melting peak is 25° C. or more but 40° C. or less.

[8] A polypropylene resin in-mold foaming molded product prepared from the polypropylene resin expanded particles according to any one of [1] to [7] by in-mold foaming molding.

Advantageous Effects of Invention

Polypropylene resin expanded particles have such characteristics that polypropylene resin expanded particles which (i) can produce an in-mold foaming molded product at a very low mold heating steam pressure, (ii) exhibit low distortion, low shrinkage, and a wide range of heating condition for molding, even if the mold heating steam pressure is increased, (iii) indicate a satisfactory moldability in a case where the expanded particles are molded using a mold having a complicated shape, a large mold, or the like, and (iv) maintain its properties such as compressive strength, without being impaired largely, in a case where the polypropylene resin expanded particles prepare the in-mold foaming molded product.

BRIEF DESCRIPTION OF DRAWINGS

FIG. 1

FIG. 2

FIG. 3

FIG. 3 is a view illustrating a method for calculating a ratio (QH/(QH+QL)×100) (referred to as "DSC ratio") of quantity of heat of a melting peak on a higher temperature side according to the present invention, where QL is a quantity of heat at a melting peak on the lower temperature side, which quantity of heat is represented by an area enclosed by (i) the melting peak on the lower temperature side and (ii) a tangent extending, to a baseline from which melting starts, from a maximum point between the melting peak on the lower temperature side and the melting peak on the higher temperature side, where QH is a quantity of heat at the melting peak on the higher temperature side, which quantity of heat is represented by an area enclosed by (i) the melting peak on the higher temperature side and (ii) a tangent extending, to a baseline at which the melting ends, from the maximum point between the melting peak on the lower temperature side and the melting peak on the higher temperature side.

DESCRIPTION OF EMBODIMENTS

A polypropylene resin used in the present invention is a resin containing propylene as a main component as monomer, and examples of the polypropylene resin encompass a polypropylene resin polymerized by using a metallocene polymerization catalyst, a polypropylene resin polymerized by using a Ziegler polymerization catalyst, and the like.

Regarding a composition thereof, the polypropylene resin used in the present invention may be, for example, a propylene.ethylene random copolymer, a propylene.1-butene random copolymer, a propylene.ethylene.1-butene random ternary copolymer, or the like.

A polypropylene resin prepared by using a metallocene polymerization catalyst is preferably used as a polypropylene resin used in the present invention because the polypropylene resin can have a low melting point by being prepared in the presence of the metallocene polymerization catalyst. Further, among propylene resins prepared using a metallocene polymerization catalyst, the propylene-ethylene random copolymer is preferably used in particular, in view of its versatility.

Conventional polypropylene resins polymerized using a Ziegler polymerization catalyst have a limit in melting point, and a lower melting point for commercially available products is limited to about 130° C. On the contrary, the polypropylene resin prepared using a metallocene polymerization catalyst can be prepared at a lower melting point of 130° C. or less, further, can be prepared even at 120° C. or less. The melting point of this polypropylene resin whose melting point is lowered is as low as a melting point of a polyethylene resin.

In the present invention, the polypropylene resin used as a base material resin of polypropylene resin expanded particles is preferably a low melting point resin having a high ethylene content, in order to prepare the polypropylene resin foamed products under a low steam pressure. In a case where a copolymer component which is copolymerized with propylene is ethylene, an ethylene content rate is preferably 3.0% by weight or more but 8.0% by weight or less, and more preferably 3.5% by weight or more but 7.0% by weight or less. In a case of using the Ziegler polymerization catalyst, an upper limit of the ethylene content rate is about 5% by weight. However, in a case of using the metallocene polymerization catalyst, a polypropylene resin having an ethylene content rate of about 8% by weight can be produced.

In order to achieve a wide range of heating condition for molding, the polypropylene resin used as a base material resin of the polypropylene resin expanded particles of the present invention is required to contain a low melting point component and a high melting point component. Specifically, the polypropylene resin used as a base material resin of the polypropylene resin expanded particles of the present invention is necessary to have at least two melting peaks on a DSC curve obtained by measurements of melting points with use of a differential scanning calorimeter, the at least two melting peaks including (i) a lowest-temperature melting peak of 100° C. or more but 130° C. or less and (ii) a highest-temperature melting peak of 140° C. or more but 160° C. or less.

In the present invention, the DSC curve obtained by the measurements of the melting point of the polypropylene resin with use of the differential scanning calorimeter means a DSC curve in a second temperature rise with use of the differential scanning calorimeter, which is obtained by (i) raising a temperature of 3 mg to 6 mg of a sample from 20° C. to 220° C. at a heating rate of 10° C./min, (ii) lowering the temperature from 220° C. to 20° C. at a cooling rate of 10° C./min, and (iii) raising the temperature again from 20° C. to 220° C. at a heating rate of 10° C./min. A melting point is a peak temperature of a melting peak on the DSC curve.

The DSC curve has a plurality of melting peaks as described in the present invention, that is, the polypropylene resin has a plurality of melting points.

A lowest-temperature melting peak of the polypropylene resin used in the present invention is 100° C. or more but 130° C. or less, and preferably 105° C. or more but 120° C. or less. It is difficult to produce a resin having a melting point of 130° C. or less with use of a normal Ziegler polymerization catalyst, so that a component producing the lowest-temperature melting peak is preferably derived from the polypropylene resin polymerized using the metallocene polymerization catalyst.

It is preferable that the amount of a lowest melting point component producing a lowest melting peak temperature accounts for 60% by weight or more but 95% by weight or less of the polypropylene resin used in the present invention.

Here, in a case where the polypropylene resin having the low melting point and the polypropylene resin having the high melting point are mixed with each other in melted states, the amount of the lowest melting point component means the percentage (% by weight) of the low melting point component to be mixed. Meanwhile, in a case of a multi-stage polymerization method in which the polypropylene resin having the low melting point and the polypropylene resin having the high melting point are produced as a mixture at the time of polymerization, the amount of the lowest melting point component means a value obtained by subtracting, from the amount of all components, a value of the high melting point component which is calculated (area of high-temperature part/whole area) on the basis of an area of a high-temperature part on a melting peak curve which is obtained by the measurements of the polymer thus generated by means of a temperature rising elution fractionation (TREF).

A highest-temperature melting peak of the polypropylene resin used in the present invention is 140° C. or more but 160° C. or less, and preferably 140° C. or more but 155° C. or less.

The component producing the highest-temperature melting peak is preferably derived from (i) a polypropylene resin, such as a polypropylene homopolymer, a propylene random copolymer, or the like, which is polymerized by using a metallocene polymerization catalyst, (ii) or a polypropylene resin, such as a propylene random copolymer or the like polymerized by using a Ziegler polymerization catalyst.

In the polypropylene resin used in the present invention, a foaming temperature and a molding temperature tend to be high as the melting point of the component producing the highest-temperature melting peak becomes high, or as the amount of the component producing the highest-temperature melting peak becomes large. So, in a case where (i) a melting point difference between the highest-temperature melting peak and the lowest-temperature melting peak is too large or (ii) the amount of the high melting point component is too large, the foaming temperature becomes high, so that crystals of the low melting point component are all melted or a melting viscosity of crystals becomes too low. As a result, the polypropylene resin thus obtained tends to produce expanded particles with a ununiform cell structure or with open-cell foams.

The component producing the highest-temperature melting peak is preferably derived from the polypropylene resin polymerized using a metallocene polymerization catalyst, and more preferably derived from a polypropylene homopolymer polymerized using a metallocene polymerization catalyst. This is because the polypropylene resin polymerized using a methallocene polymerization catalyst has a higher rigidity, compared with the polypropylene resin produced to have the same melting point as the said polypropylene resin, but polymerized using other polymerization catalysts.

In order to obtain a polypropylene resin having highest-temperature and lowest-temperature melting peaks, a polypropylene resin having a low melting point and a polypropylene resin having a high melting point can be mixed in the melted states with use of an extruder, a kneader, a Banbury mixer, a roller, or the like, or can be produced as a mixture thereof at the time of polymerizing polypropylene by means of multi-stage polymerization (that is, the polypropylene resin can be composed as if the polypropylene resin having a low melting point and the polypropylene resin having a high melting point were mixed with each other).

It is preferable to use, as a polypropylene resin, a polypropylene resin obtained by means of the multi-stage polymerization because the components of the polypropylene resin are mixed well with each other. Further, the polypropylene resin obtained by means of the multi-stage polymerization tends to have uniform cell diameters. Also in consideration of this, it is preferable to use the polypropylene resin obtained by means of the multi-stage polymerization.

In the present invention, in a case where a polypropylene resin is produced by the multi-stage polymerization with use of a metallocene catalyst, the polypropylene resin is subjected to steps of preliminary polymerization (P-1), prepolymerization (P-2), and polymerization (P-3). It is preferable that these steps are sequentially carried out in the presence of a metallocene polymerization catalyst.

Preliminary polymerization step (P-1): a step of producing a preliminary polymer by polymerizing ethylene. By adding a small amount of an ethylene preliminary polymer, the polymerization catalyst can be stabilized.

Prepolymerization step (P-2): a step of producing a prepolymer by polymerizing propylene in the presence of a preliminary polymer.

Polymerization step (P-3): a step of producing a propylene copolymer by copolymerizing propylene, ethylene, and/or a $C_4$ or greater α-olefin in the presence of the prepolymer.

The metallocene polymerization catalyst of the polypropylene resin of the present invention, which catalyst is used for the multi-stage polymerization, is preferably a metallocene polymerization catalyst containing a metallocene compound represented by Formula 1 below. By using the metallocene polymerization catalyst, the amount of hetero-bonding of 2,1-insertion and/or 1,3-insertion is reduced to 0.2% by mol or less in total.

(where $R^1, R^2, R^3, R^4, R^5, R^6, R^7, R^8, R^9, R^{10}, R^{11}, R^{12}, R^{13}$, and $R^{14}$ identically or independently one selected from the group consisting of a hydrogen atom, a hydrocarbon group, and a silicon-containing group; M represents a group-4 transition metal; Y represents a carbon atom or a silicon atom; Q is identically or independently one selected from the group consisting of a halogen atom, a hydrocarbon group, an anion ligand, and a neutral ligand coordinatable with a lone pair of electrons; and j is an integer of 1 to 4.)

It is preferable that, in order to obtain uniform cell diameters and widen the range of heating condition for molding, the polypropylene resin used as a base material resin of the polypropylene resin foamed particle of the present invention has at least three melting peaks on the DSC curve obtained by measurements of melting points with use of the differential scanning calorimeter, the at least three melting peaks including (i) the lowest-temperature melting peak of 100° C. or more but 130° C. or less, (ii) the highest-temperature melting peak of 140° C. or more but 160° C. or less, and (iii) a melting peak between the lowest-temperature melting peak and the highest-temperature melting peak.

In a case where (i) the lowest-temperature melting peak is derived from the polypropylene resin polymerized using a metallocene polymerization catalyst and (ii) the highest-temperature melting peak is derived from the polypropylene homopolymer polymerized using a metallocene polymerization catalyst, a melting peak tends to appear between the lowest-temperature melting peak and the highest-temperature melting peak. The melting peak appearing between the lowest-temperature melting peak and the highest-temperature melting peak is assumed to be an eutectic of (i) the polypropylene resin causing the lowest-temperature melting peak and (ii) the polypropylene resin causing the highest-temperature melting peak.

In order to obtain polypropylene resin expanded particles having uniform cell diameters and a wide range of heating condition for molding, it is preferable to use such a polypropylene resin that its melting peak appears clearly between a lowest-temperature melting peak and a highest-temperature melting peak.

The melt flow rate (MFR) of the polypropylene resin of the present invention is preferably 2 g/10 min or more but less than 50 g/10 min or less, and more preferably 5 g/10 min or more but 40 g/10 min or less. Note that, in a case of the polypropylene resin polymerized using a metallocene polymerization catalyst, a molecular weight distribution tends to be small, and a low molecular weight component having a plasticizing action tends to decrease. Therefore, in a case where the polypropylene resin polymerized using a metallocene polymerization catalyst is employed as the polypropylene resin serving as the base material resin, the MFR of the polypropylene resin is preferably set to be higher than that of a resin polymerized using a Ziegler polymerization catalyst so that the polypropylene resin polymerized using a metallocene polymerization catalyst can obtain a satisfactory foamability.

Here, an MFR is measured under a condition where (i) an MFR measuring instrument described in JIS-K 7210 is used, (ii) an orifice is 2.0959±0.005 mm in diameter, (iii) the orifice is 8.000±0.025 mm in length, (iv) a load is 2160 g, and (v) a resin temperature is 230±0.2° C. If the MFR of the polypropylene resin is less than 2 g/10 min, the foamability tends to decrease. Meanwhile, if the MFR of the polypropylene resin exceeds 50 g/10 min, cells of the polypropylene resin expanded particles are destroyed, so that the polypropylene resin tends to generate open cell foams.

It is possible to use, together with the polypropylene resin of the present invention, other thermoplastic resin that can be used together with the polypropylene resin, as long as such thermoplastic resin does not impair properties of the polypropylene resin. Such thermoplastic resins are, for example, low-density polyethylene, linear low-density polyethylene, polystyrene, polybutene, ionomer, and the like.

Generally, in order to produce expanded particles easily, it is preferable that the polypropylene resin is, in advance, (i) melted with use of an extruder, a kneader, a Banbury mixer, a role, and the like and (ii) processed to be particles each having a desired shape such as a cylinder, an ellipse, a sphere, a cube, a rectangular parallelepiped, or the like.

The polypropylene resin particles of the present invention are processed to have a size such that a weight of one particle is preferably in a range of 0.1 mg to 30 mg, and more preferably in a range of 0.3 mg to 10 mg.

Here, the weight of one particle of the resin particles is an average weight of 100 resin particles picked up from the polypropylene resin particles in a random manner, weighting the 100 resin particles, and taking an average of the resin particles. The average weight of the resin particles is indicated in the unit of mg/particle.

In a case where hydrocarbon foaming agents such as propane, normal butane, isobutane, normal pentane, isopentane, hexane, etc. are used as a foaming agent, it is preferable to add, as the additive to the polypropylene resin used in the present invention, an inorganic substance which is to be a cell nucleating agent such as talc, silica, and calcium carbonate. The additive amount of the inorganic substance which is to be a cell nucleating agent is preferably 0.005 part by weight or more but 0.5 part by weight or less.

In a case where an inorganic foaming agent such as air, nitrogen, carbon dioxide gas, water, or the like is used as an additive to the polypropylene resin particle used for the present invention, it is preferable to use an inorganic nucleating agent and/or a water absorbing substance.

The water absorbing substance is a substance that allows the polypropylene resin particles to contain water when the polypropylene resin particles are added with the substance and are brought into contact with water or when the polypropylene resin particles are impregnated with a foaming agent in an aqueous dispersion system.

In specific, examples of the water absorbing substance encompass: water-soluble inorganic substances such as sodium chloride, calcium chloride, magnesium chloride, sodium borate, zinc borate, etc.; polyethylene glycol; a special block polymer containing polyether as a hydrophilic segment [trade name: PELESTAT; produced by Sanyo Chemical Industries, Ltd.]; hydrophilic polymers such as an alkali metal salt of an ethylene(meta) acrylic acid copolymer, an alkali metal salt of a butadiene(meta)acrylic acid copolymer, an alkali metal salt of a carboxylated nitrile rubber, an alkali metal salt of an isobutylene-maleic anhydride copolymer, an alkali metal salt of a poly(meta)acrylic acid, etc.; polyalcohols such as ethylene glycol, glycerol, pentaerythritol, isocyanuric acid, etc.; melamine; and the like. These water-soluble inorganic substances, hydrophilic polymers, polyalcohols, and the like can be used alone or two or more of them can be used in combination.

The additive amount of the water absorbing substance would differ depending on a foaming ratio to be intended, a foaming agent to be used, and the kind of water absorbing substance to be used, so that the additive amount cannot be determined without reservation. However, the amount of water-soluble inorganic substances or polyalcohols to be used are preferably 0.01 part by weight or more but 2 parts by weight or less with respect to 100 parts by weight of the polypropylene resin, and the amount of hydrophilic polymers to be used is preferably 0.05 part by weight or more but 5 parts by weight or less with respect to 100 parts by weight of the polypropylene resin.

In the present invention, an additive can be added as appropriate to the polypropylene resin. Examples of the additive encompass antistatic agents, pigments, flame resistance improving agents, conductivity improving agents, and the like. Generally in this case, the additive is preferably added to molten resin during production of the resin particles.

A method for producing polypropylene resin expanded particles are not particularly limited. However, the following method is preferable: in a pressure-resistant vessel, polypropylene resin particles are dispersed into the water, together with a dispersant etc., in the presence of a foaming agent; the polypropylene resin particles are heated to a predetermined foaming temperature under pressure, and in addition, the foaming agent is impregnated to the resin particles; and after that, a dispersion substance including the polypropylene resin particles in the pressure-resistant vessel is released and foamed to a low pressure area while a temperature and a pressure in the pressure-resistant vessel are kept constantly.

A temperature inside in the pressure-resistant vessel at releasing the dispersion into a low pressure area therefrom (hereinafter, this temperature may be referred to as "foaming temperature" where appropriate) is preferably within a range of an intermediate temperature+/−15 (° C.), using the intermediate temperature as a reference, where the intermediate temperature is a temperature intermediate between (i) a melting peak temperature which is the lowest temperature of 100° C. or more but 130° C. or less and (ii) a melting peak temperature which is the highest temperature of 140° C. or more but 160° C. or less [that is, in a case where an intermediate peak exists, the intermediate temperature is a temperature of the intermediate peak, and in a case where an intermediate peak does not exist, the intermediate temperature=the lowest melting peak temperature+the highest melting peak temperature)/2(° C.)]. This is because a ratio (QH/(QH+QL)×100) (hereinafter, a DSC ratio) of quantity of heat of melting peak on a higher temperature side of the polypropylene resin expanded particles can be adjusted to 10% or more but 50% or less when the foaming temperature is within the range.

In the present invention, in a case where an inorganic foaming agent such as air, nitrogen, carbon dioxide gas, water, or the like is used as a foaming agent, the polypropylene resin may be prepared using a so-called two-stage process in order to obtain expanded particles with a high foaming ratio. This is because the polypropylene resin which is subjected to only first-stage foaming would have a relatively low foaming ratio. The two-stage process is a process in which, after the polypropylene resin expanded particles are obtained using the aforementioned method, the expanded particles are impregnated with inert gas such as air etc., and then, are heated to be further foamed.

Examples of the foaming agent impregnated to the polypropylene resin particles of the present invention encompass: hydrocarbon foaming agents such as propane, normal butane, isobutane, normal pentane, isopentane, hexane, etc.; and inorganic foaming agents such as air, nitrogen, carbon dioxide gas, water, etc. These foaming agents can be used alone, or two or more of the foaming agents can be used in combination. Out of these foaming agents, it is preferable to use carbon dioxide gas, water, or isobutane that attains a higher foaming ratio.

The usage amount of the foaming agent would be changed depending on a resin to be used, a foaming agent to be used, and a desired foaming ratio, however, the foaming agent may be used appropriately in accordance with a desired foaming ratio of the polypropylene resin expanded particles. In general, the usage amount of the foaming agent is preferably 1 part by weight or more but 60 parts by weight or less with respect to 100 parts by weight of the polypropylene resin particles.

A pressure-resistant vessel to be used during the production of the polypropylene resin particles is not particularly limited, and the pressure-resistant vessel only needs to resist a pressure in the container and a temperature in the container during the production of the polypropylene resin particles. Such pressure-resistant vessel is, for example, an autoclave.

Examples of the dispersant used in the present invention encompass inorganic dispersants such as tertiary calcium phosphate, tertiary magnesium phosphate, basic magnesium carbonate, calcium carbonate, basic zinc carbonate, aluminum oxide, iron oxide, titanium oxide, aluminosilicate, barium sulfate, kaolin, and the like.

In the present invention, a dispersion auxiliary agent may be used together with the dispersant. Examples of the dispersion auxiliary agent to be used encompass surfactants such as sodium dodecylbenzenesulfonate, sodium n-paraffin sulfonate, sodium alpha olefin sulfonate, and the like. Out of them, it is preferable to use tertiary calcium phosphate as the dispersant and sodium n-paraffin sulfonate as the dispersion auxiliary agent in combination.

The usage amount of the dispersant or the dispersion auxiliary agent would differ depending on the kind of the dispersant or the dispersion auxiliary agent to be used, the kind of polypropylene resin to be used, and the usage amount of the polypropylene resin. For example, in a case where an introducing ratio of the polypropylene resin particles and water is within the range of 1/3 to 1/1, it is preferable that (i) the dispersant is 0.1 part by weight or more but 5 parts by weight or less with respect to the water of 100 parts by weight and (ii) the dispersion auxiliary agent is 0.001 part by weight or more but 0.1 part by weight or less with respect to the water of 100 parts by weight. This is because: dispersion stability can be secured; and the dispersant is less apt to adhere to surfaces of the expanded particles to be obtained and therefore the dispersant does not prevent the expanded particles from fusing to each other when the in-mold foaming molded product is prepared.

The polypropylene resin expanded particles which can be obtained as described above in the present invention preferably have at least two melting peaks on the DSC curve which is obtained by raising a temperature of a sample of 3 mg to 6 mg from 20° C. to 220° C. at a heating rate of 10° C./min with use of the differential scanning calorimeter, that is, which is obtained in first measurement of temperature rise with use of the differential scanning calorimeter.

It is preferable that, in order to obtain satisfactory moldability, the lowest melting peak temperature of the polypropylene resin expanded particles is 100° C. or more but 130° C. or less, and the highest melting peak temperature thereof is 140° C. or more but 160° C. or less. The in-mold foaming molding can be performed with a lower mold heating steam pressure as the lowest melting peak temperature is lowered. Further, by containing a predetermined amount of the high melting point component producing the highest-temperature melting peak, the polypropylene resin expanded particles can be processable by the in-mold foaming molding at a high temperature, thereby having a wider range of heating condition for molding.

Here, in a case where the polypropylene resin having the low melting point and the polypropylene resin having the high melting point are mixed with each other in melted states, the amount of the highest melting point component producing the highest melting peak means the percentage (% by weight) of the high melting point component to be mixed. Meanwhile, in a case of a multi-stage polymerization method in which the polypropylene resin having the low melting point and the polypropylene resin having the high melting point are produced as a mixture at the time of polymerization, the amount of the high melting point component producing the highest melting peak means a value which is calculated (area of high-temperature part/whole area) on the basis of an area of a high-temperature part on a melting peak curve which is obtained by the measurements of the polymer thus generated by means of a temperature rising elution fractionation (TREF).

In order to achieve a wide range of heating condition for molding, a difference between the lowest melting peak temperature and the highest melting peak temperature, which difference appears on the DSC curve obtained in the first measurement of temperature rise of the polypropylene resin expanded particles of the present invention with use of a differential scanning calorimeter, is preferably 25° C. or more but 40° C. or less, and more preferably 30° C. or more but 40° C. or less.

In a case where a polypropylene resin having only one melting peak is used as a base material resin, a difference between the lowest melting peak temperature and the highest melting peak temperature of polypropylene resin expanded particles becomes less than 25° C. Therefore, the range of heating condition for molding is insufficient to mold an in-mold foaming molded product with use of a mold having a complicated shape, a large mold, or the like.

Consider a case where the expanded particles are produced by the method in which: in a pressure-resistant vessel, polypropylene resin particles are dispersed into water, together with a dispersant etc., in the presence of a foaming agent; the polypropylene resin particles are heated to a predetermined foaming temperature under pressure, and in addition, the foaming agent is impregnated to the resin particles; and after that, a dispersion substance in the pressure-resistant vessel is released and foamed to a low pressure area while a temperature and a pressure in the pressure-resistant vessel are kept constantly. In this case, the foaming temperature tends to be high as (i) the highest melting peak temperature of the base material resin increases or (ii) as the content of the polypropylene resin causing the highest-temperature melting peak of the base material resin increases.

Further, in a case where the polypropylene resin as the base material resin is one derived from a polypropylene resin having a highest-temperature melting peak exceeding 160° C. (for example, a polypropylene homopolymer polymerized using a Ziegler polymerization catalyst), the foaming temperature is raised. Accordingly, a cell structure of the polypropylene resin expanded particles thus obtained are easily destroyed and ununiform cells are generated, so that the expanded particles tend to generate open cell foams. In addition, the surfaces of the polypropylene resin in-mold foaming molded product tend to be recessed, or the polypropylene resin in-mold foaming molded product tends to shrink largely.

Figure 1:
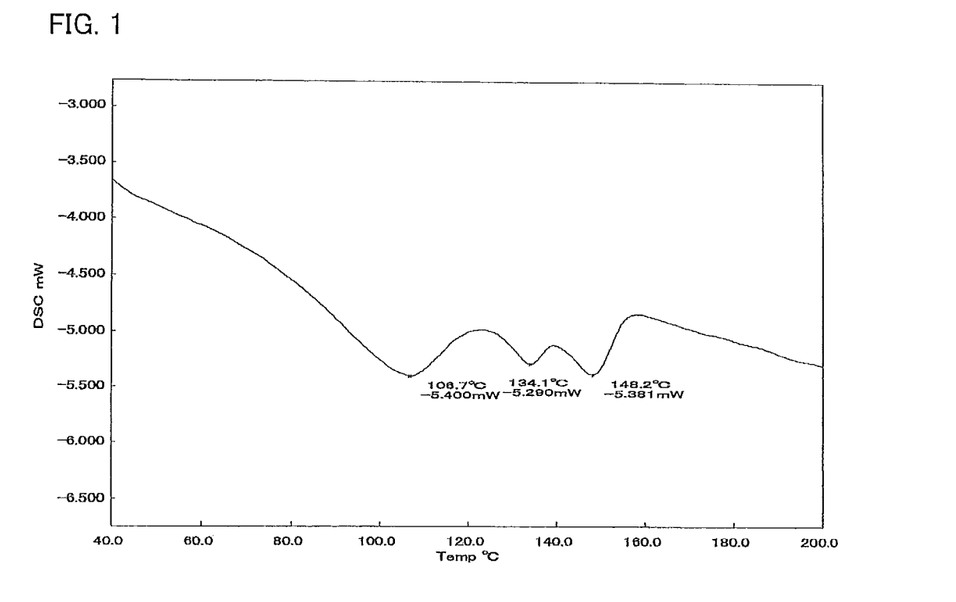
FIG. 1 is a view illustrating a DSC curve obtained by the measurements of melting points of a propylene resin according to Example 1 of the present invention is measured.
Figure 2:
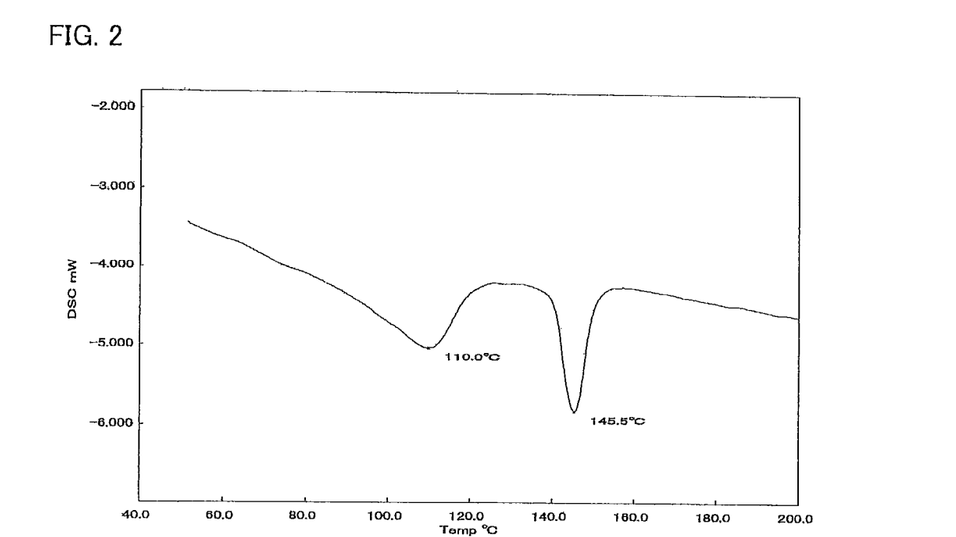
FIG. 2 is a view illustrating a DSC curve obtained in first measurement of temperature rise of propylene resin expanded particles according to Example 1 of the present invention.
Figure 3:
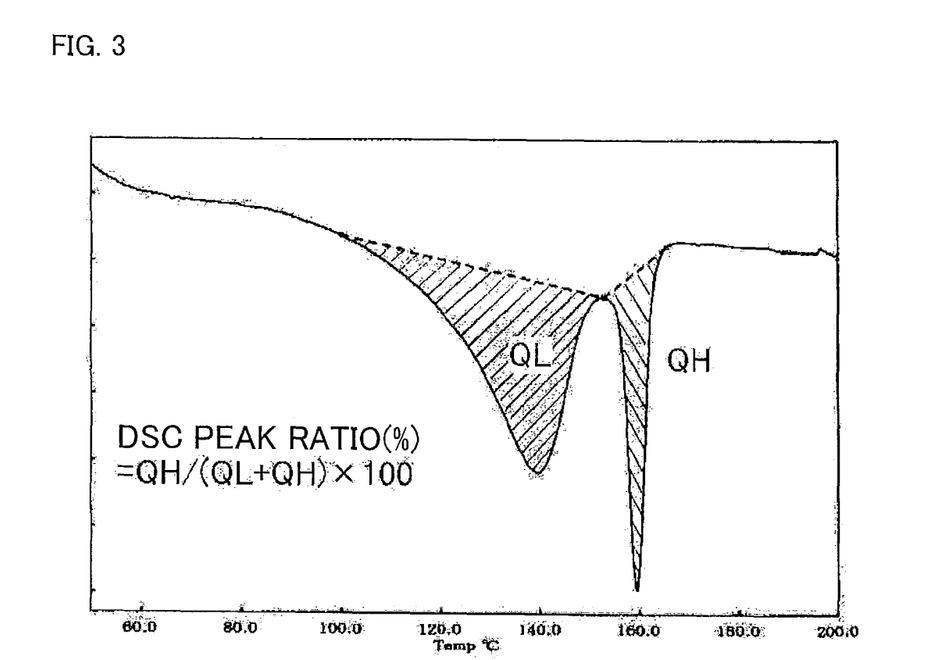

A DSC ratio of the polypropylene resin expanded particles of the present invention, i.e., a ratio (=QH/(QH+QL)×100) of quantity of heat of melting peak on higher temperature side is preferably 10% or more but 50% or less.

When the DSC ratio of the polypropylene resin expanded particles is less than 10%, a rate of independent cells of the polypropylene resin expanded particles tends to be low, whereby a distortion rate of the polypropylene resin in-mold foaming molded product tends to be large. When the DSC ratio exceeds 50%, the in-mold foaming molding with the polypropylene resin expanded particles could not be performed with an enough secondary foaming power, thereby resulting in a polypropylene resin in-mold foaming molded product in which the expanded particles are not fused well to each other, i.e., like awaokoshi (which is a cereal bar-like Japanese confectionery: i.e., a state in which the particles are fused to each other with gaps therebetween).

Here, the quantity of heat QL at the melting peak on the lower temperature side is a quantity of heat represented by an area enclosed by (i) the melting peak on the lower temperature side and (ii) a tangent extending, to a baseline from which melting starts, from a maximum point between the melting peak on the lower temperature side and the melting peak on the higher temperature side. The quantity of heat QH at the melting peak on the higher temperature side is a quantity of heat represented by an area enclosed by (i) the melting peak on the higher temperature side and (ii) a tangent extending, to a baseline at which the melting ends, from the maximum point between the melting peak on the lower temperature side and the melting peak on the higher temperature side.

An average cell diameter of the polypropylene resin expanded particles of the present invention is preferably 30 µm or more but 1000 µm or less, more preferably 50 µm or more but 500 µm or less, and most preferably 100 µm or more but 350 µm or less.

If the average cell diameter is less than 30 µm, the polypropylene resin expanded particles tend to shrink largely and a surface of the in-mold foaming molded product tends to become less beautiful when the polypropylene resin expanded particles prepares the in-mold foaming molded product. In a case where the average cell diameter is 1000 µm or more, the cell diameters tend to be ununiformly and the polypropylene resin expanded particles tend to vary widely in foaming ratio.

Here, an average cell diameter of the polypropylene expanded particles is measured as follows: 10 of the expanded particles are sampled in a random manner; each of the expanded particles is cut into two pieces; and a cross-section of each piece is observed microscopically. Cells across a line of 2 mm (2000 µm) in the middle of a piece are counted, and the cell diameter (µm) is found by calculating 2000/the number of cells. The average cell diameter is obtained by averaging the cell diameters of the 10 expanded particles.

The polypropylene resin expanded particles thus obtained as described above according to the present invention is for use in in-mold foaming molding for molding the polypropylene resin expanded particles into a polypropylene resin in-mold foaming molded product.

The in-mold foaming molding with the polypropylene resin expanded particles may be performed by the following conventionally known methods: (A) using the expanded particles as such; (B) injecting inorganic gas such as air into the expanded particles in advance to impart a foaming ability to the expanded particles; (C) compressing the expanded particles so as to increase an internal pressure thereof, introducing into a mold the expanded particles with the increase internal pressure, and molding the expanded particles; and the like.

For example, in a case of (B), the polypropylene resin expanded particles are molded into the polypropylene resin in-mold foaming molded product by the following steps: pressurizing air inside a pressure-resistant vessel in advance, and injecting the air into the polypropylene resin expanded particles; adjusting an internal pressure of the expanded particles to about 0.12 MPa to 0.3 MPa to impart a foaming ability to the expanded particles; introducing the expanded particles into a closable but not sealable mold; molding the expanded particles by using steam as a heating medium under a heating steam pressure of about 0.1 MPa·G to 0.4 MPa·G for about 3 seconds to 30 seconds, thereby fusing the polypropylene resin expanded particles to each other; and then water-cooling the mold, thereby cooling the in-mold foaming molded product to such an extent that the in-mold foaming molded product will not deform after the in-mold foaming molded product is removed from the mold.

The polypropylene resin in-mold foaming molded product thus obtained has a foaming ratio of 3 times to 100 times in general, preferably 6 times to 60 times.

Here, the foaming ratio of the polypropylene resin in-mold foaming molded product can be obtained by the following expression by using a dry weight W (g) of the foaming molded product, an submergence volume V (cm$^3$), and a density d=0.9 g/cm$^3$ of the polypropylene resin: foaming ratio=d×V/W=0.9×V/W.

The density of the polypropylene resin in-mold foaming molded product obtained using the aforementioned polypropylene resin expanded particles is preferably 9 g/L or more but 300 g/L or less, more preferably 15 g/L or more but 150 g/L or less.

EXAMPLES

Hereinafter, the present invention will be described in detail in reference with Examples. Note, however, that the present invention is not limited to Examples.

Measurement and Evaluation of Examples were carried out as described below.

<Measurement of Melting Point of Polypropylene Resin>

A melting point was measured using a differential scanning calorimeter (DSC) [Model DSC6200, produced by Seiko Instruments Inc.]. The melting point is set as a temperature at a melting peak in a second temperature rise on a DSC curve which is obtained by raising a temperature of polypropylene resin particles (3 mg to 6 mg) from 20° C. to 220° C. at a heating rate of 10° C./min, lowering the temperature from 220° C. to 20° C. at a cooling rate of 10° C./min, and then again raising the temperature from 20° C. to 220° C. at a heating rate of 10° C./min.

<DSC Measurement of Expanded Particles>

Each temperature at a melting peak in a first temperature rise on the DSC curve which was obtained by raising a temperature of polypropylene resin expanded particles (3 mg to 6 mg) from 20° C. to 220° C. at a heating rate of 10° C./min was measured using a differential scanning calorimeter (DSC) [Model DSC6200, produced by Seiko Instruments Inc.].

<Foaming Ratio of Expanded Particles>

A weight w (g) and an ethanol submergence volume V (cm$^3$) of the polypropylene resin expanded particles having a bulk volume of about 50 cm$^3$ were measured. Then, a foaming ratio was calculated by the following expression by using a density d (g/cm$^3$) of polypropylene resin particles that had not yet been foamed:

foaming ratio=$d \times V/W$.

<Density of In-Mold Foaming Molded Product>

The density of the polypropylene resin in-mold foaming molded product thus obtained was calculated by the following expression by using a dry weight W (g) and a submergence volume V (cm$^3$) of the in-mold foaming molded product:

density of in-mold foaming molded product(g/L)=$(W/V) \times 1000$.

<Compression Strength of Polypropylene Resin In-Mold Foaming Molded Product by 50% Compression>

A test piece having 50 mm in length×50 mm in width×25 mm in thickness was cut out from the polypropylene resin in-mold foaming molded product thus obtained. The in-mold foaming molded product thus cut out was compressed at a rate of 10 mm/min according to NDZ-Z0504, and a compressive stress (MPa) of the in-mold foaming molded product obtained when the in-mold foaming molded product was compressed by 50% was measured.

The compressive stress obtained when the in-mold foaming molded product having the density of about 20 g/L was compressed by 50% was evaluated by the following references.

○: The compressive strength obtained when the in-mold foaming molded product compressed by 50% was 0.12 MPa or more.

x: The compressive strength obtained when the in-mold foaming molded product compressed by 50% was less than 0.12 MPa.

<Evaluation of Molded Product>

The expanded particles were subjected to in-mold foaming molding under various mold heating steam pressures within the range of 0.09 MPa·G to 0.30 MPa·G (gauge pressure) with use of a polyolefin foam molding machine [KD-345 produced by DAISEN Co., Ltd.,] and a mold of 400 mm in length×300 mm in width×50 mm in thickness.

The polypropylene resin in-mold foaming molded product thus obtained was let stand for one hour at a room temperature, dried and cured for fifteen hours in a temperature-controlled room at 75° C., and was taken out again and let stand for four hours at a room temperature. Then, fusion between the expanded particles, surface property, a dimensional shrinkage rate, and a distortion rate of the in-mold foaming molded product were evaluated, and a range of heating condition for molding was evaluated by the following references.

Specifically, the lowest and highest mold heating steam pressures (of the polypropylene resin in-mold foaming molded product obtained by changing the mold heating steam pressure) to pass all of the fusion, the surface property, the dimensional shrinkage rate, and the distortion rate were found, and a difference between the lowest and highest mold heating steam pressures was set to be a range of heating condition for molding.

○: The range of heating condition for molding is 0.1 MPa·G (gauge pressure) or more.

Δ: The range of heating condition for molding is 0.05 MPa·G (gauge pressure) or more but less than 0.1 MPa·G (gauge pressure).

x: The range of heating condition for molding is less than 0.05 MPa·G (gauge pressure).

(1) Evaluation of Fusion

The polypropylene resin in-mold foaming molded product thus obtained was notched in a depth of about 5 mm to 10 mm in thickness direction of the in-mold foaming molded product with use of a utility knife, and then cleaved apart along the notch by hand. A cleaved surface of the cleaved in-mold foaming molded product was observed to find out how much particles were cleaved to lose their particle surfaces on the cleaved surface of the cleaved in-mold foaming molded product. Based on the percentage, the fusion was determined by the following references.

Pass: 60% or more of the particles were cleaved.
Failure: Less than 60% of the particles were cleaved.

(2) Evaluation of Surface Property

The surface property of the polypropylene resin in-mold foaming molded product thus obtained was observed visually, and the surface property was evaluated by the following references.

Pass: good appearance with few gaps between particles, without much wrinkles
Failure: poor appearance with many gaps between particles, with wrinkles (3) Dimensional Shrinkage A longitudinal dimension (upper side section in longitudinal direction) of the surface property of the polypropylene resin in-mold foaming molded product thus obtained was measured, and the dimensional shrinkage ratio of the in-mold foaming molded product with respect to a longitudinal dimension of the mold (400 mm) was calculated. Then the dimensional shrinkage was determined by the following references.

Pass: the shrinkage rate with respect to the longitudinal dimension of the mold was less than 5%.
Failure: the shrinkage rate with respect to the longitudinal dimension of the mold was 5% or more.

(4) Distortion Rate

Thickness (average value of thicknesses of a center part in longitudinal direction, a part which positions 30 mm from a right side, and a part which positions 30 mm from a left side) of the polypropylene resin in-mold foaming molded product thus obtained was measured. Then the distortion rate with respect to a thickness dimension of the mold (50 mm) was calculated, and determined as follows.

Pass: the distortion rate with respect to the thickness dimension of the mold was less than 7% or less.
Failure: the distortion rate with respect to a thickness dimension of the mold was 7% or more.

Example 1

<Production of Propylene-Ethylene Random Copolymer Using a Metallocene Polymerization Catalyst>

(1) Production of Solid Catalyst Carrier 300 g of $SiO_2$ (produced by Dohkai Chemical Industries Co., Ltd.) was sampled into a 1 L side-arm flask, and slurred with 800 mL of toluene added into the flask after the sampling of $SiO_2$. Then, this slurry was transferred into a 5 L four-necked flask, and 260 mL of toluene was added into the slurry. Further, 2830 mL of methylaluminoxane (hereinafter, MAO) toluene solution (solution of 10% by weight, produced by ALBEMARLE JAPAN CORPORATION) was introduced into the flask, and the mixture thus obtained was agitated for 30 minutes. A temperature in the flask was raised to 110° C. gradually over one hour, and the mixture was agitated for four hours at 110° C. After this agitation, the mixture was cooled to a room temperature.

After cooling, a supernatant toluene was removed from the mixture, and fresh toluene was supplied to the mixture in replacement of the removed supernatant toluene. This toluene replacement was repeated until a replacement ratio became 95%.

(2) Production of Solid Catalyst Content (Preparation of Metal Catalyst Component Carrier)

2.0 g of diphenylmethylene (3-tert-butyl-5-methylcyclopentadienyl)(2,7-di-tert-butylfluorenyl)zirconiumdichloride was weighed in the 5 L four-necked flask in a glove box. The flask was taken out to the outside. 0.46 L of toluene and 1.4 L of the MAO/$SiO_2$/toluene slurry prepared by the method of (1) were added into the flask under nitrogen, and the mixture thus obtained was agitated for 30 minutes. Thus the MAO/$SiO_2$ carried diphenylmethylene (3-tert-butyl-5-methylcyclopentadienyl)(2,7-di-tert-butylfluorenyl)zirconiumdichloride.

The diphenylmethylene (3-tert-butyl-5-methylcyclopentadienyl)(2,7-di-tert-butylfluorenyl)zirconiumdichloride/MAO/$SiO_2$ toluene slurry thus obtained was subjected to toluene replacement by n-heptane until a replacement ratio became 99%, and 4.5 L of the slurry was obtained finally. These operation was carried out at a room temperature.

(3) Preliminary Polymerization P-1

202 g of the solid catalyst content prepared from (2), 109 mL of triethylaluminum, and 100 L of n-heptane were introduced into an autoclave (capacity: 200 L) provided with an agitator. Inside of the autoclave kept at 15° C. to 20° C., 2020 g of ethylene was added into the autoclave, and was reacted with the mixture for 180 minutes under agitation.

After polymerization, solid content was sedimented. After supernatant was removed therefrom, the solid content was washed with n-heptane. The process from the sedimentation to n-heptane washing was carried out twice. Note that washing ratio of catalyst calculated from the amount of solvent (n-heptane) thus introduced and the amount of solvent thus collected was 99%.

The preliminary polymer thus obtained was suspended again in refined n-heptane, thereby obtaining a solution, which was then adjusted to solid catalyst content of 2 g/L by adding n-heptane. The preliminary polymer was partially sampled and analyzed. The analysis showed that the preliminary polymer contained 10 g of polyethylene per 1 g of the solid catalyst content.

(4) Pre-Polymerization P-2

Into a tubular polymerization vessel (capacity: 58 L), propylene, hydrogen, the catalyst slurry of the preliminary polymer obtained from preliminary polymerization (3), and triethylaluminum were continuously supplied at the following rates: propylene at a rate of 57 kg/hr, hydrogen at a rate of 4 NL/hr, the catalyst slurry at a rate of 7.1 g/hr (solid catalyst content basis) and triethylaluminum at a rate of 4.0 mL/hr, and were polymerized in the absence of a gas phase inside the tubular polymerization vessel (full of liquid). A temperature of the tubular polymerization vessel was 30° C., and a pressure in the vessel was 2.6 MPa·G.

(5) Polymerization P-3

The slurry obtained from the pre-polymerization (4) was supplied to a polymerization vessel (capacity: 1000 L) provided with an agitator, and was further polymerized. The polymerization was carried out in such a manner that propylene and ethylene were supplied into the polymerization vessel at a rate of 50 kg/hr at a rate of 1.6 kg/hr, respectively, and hydrogen was also supplied into it so that concentration of hydrogen became 0.39% by mol in a gas phase in the polymerization vessel, and the polymerization was carried out under the condition of a polymerization temperature of 60° C. and a pressure of 2.5 MPa·G.

The slurry thus obtained was supplied to a polymerization vessel (capacity: 500 L) provided with an agitator, and was further polymerized. The polymerization was carried out in such a manner that propylene and ethylene were supplied into the polymerization vessel at a rate of 11 kg/hr at a rate of 1.1 kg/hr, respectively, and hydrogen was also supplied into it so that concentration of hydrogen became 0.39% by mol in the gas phase in the polymerization vessel, and polymerization was carried out under the condition of a polymerization temperature of 59° C. and a pressure of 2.4 MPa·G.

The slurry thus obtained was subjected to a vaporization process, so that the solid was separated from the gas thereafter. Thus a propylene copolymer was obtained. The propylene copolymer was vacuum-dried at 80° C.

Note that the propylene-ethylene random copolymer thus obtained had ethylene content of 5.2% by weight and polypropylene homopolymer content of 15% by weight, and a lowest melting peak temperature and a highest melting peak temperature which were obtained by the measurements of the melting points using the differential scanning calorimeter were 106° C. and 146° C., respectively, and MFR was 12 g/10 min.

<Production of Polypropylene Resin Particles>

100 parts by weight of the propylene-ethylene random copolymer thus obtained was blended with 0.1 parts by weight of talc [PKS, manufactured by Hayashi-Kasei Co., Ltd] serving as a cell nucleating agent and 0.5 parts by weight of polyethylene glycol [PEG#300, produced by Lion Corporation] serving as an absorbent, and the mixture thus obtained was melted and kneaded in a single screw extruder having a shaft of 50 mm [Model 20VSE-50-28, manufactured by Osaka Seiki Kosaku Co., Ltd.]. Then, a melted and kneaded resin thus obtained was extruded through a circular die so as to be in a form of strand, cooled with water, and cut with a pelletizer. Thus polypropylene resin particles of 1.2 mg/particle was obtained.

<Production of Polypropylene Resin Expanded Particles>

100 parts by weight of the polypropylene resin particles thus obtained, 200 parts by weight of water, 0.5 part by weight of tertiary calcium phosphate serving as a dispersant, and 0.05 part by weight of sodium n-paraffin sulfonate serving as a dispersion auxiliary agent were introduced into a pressure-resistant autoclave (capacity: L), and 6.25 parts by weight of carbon dioxide gas serving as a foaming agent was added to the mixture thus obtained under agitation. The mixture in the autoclave was heated to a foaming temperature of 134° C., and then carbon dioxide gas was further added to set an internal pressure of the autoclave to 3.0 MPa·G (gage pressure).

After that, the pressure was maintained for 30 minutes, the mixture in the autoclave was released into an atmospheric pressure through an orifice 4.0 mm in diameter by opening a valve provided in a lower part of the autoclave. In this way, first-stage expanded particles were obtained. The first-stage expanded particles thus obtained had a foaming ratio of 11 times and a DSC ratio of 29%. An internal pressure of 0.32 MPa was imparted to the first-stage expanded particles by impregnation with air, and the first-stage expanded particles were heated with steam of 0.02 MPa·G. Consequently, the expanded particles having a foaming ratio of about 27 times was obtained.

<Production of Polypropylene in-Mold Foaming Molded Product>

The polypropylene resin expanded particles thus obtained was washed with hydrochloric acid aqueous solution (pH=1) and thereafter washed with water, and then was dried at 75° C. The expanded particles was impregnated with pressurized air in a pressure-resistant vessel to set an internal pressure of the particles to 0.2 MPa. The expanded particles were subjected to in-mold foaming molding under various mold heating steam pressures within the range of 0.09 MPa·G to 0.30 MPa·G with use of a polyolefin foam molding machine [KD-345 produced by DAISEN Co., Ltd.,] and a mold of 400 mm in length×300 mm in width×50 mm in thickness.

The polypropylene resin in-mold foaming molded product thus obtained was let stand for one hour at a room temperature, dried and cured for fifteen hours in a temperature-controlled room at 75° C., and was taken out again and let stand for four hours at a room temperature. Then, the range of heating condition for molding was evaluated on the basis of the fusion between the expanded particles, the surface property, the dimensional shrinkage rate, and the distortion rate.

TABLE 1

| | | Example 1 | Example 2 | Example 3 | Example 4 | COEX 1 | COEX 2 | COEX 3 | COEX 4 | COEX 5 |
|---|---|---|---|---|---|---|---|---|---|---|
| base material resin | Polymerization Catalyst | Meta. | Meta. | Meta. | Meta. | Meta. | Meta. | Ziegler | Ziegler | Meta. + Ziegler |
| | Kind of Comonomer | Ethylene | Ethylene | Ethylene | Ethylene | Ethylene | Ethylene | Ethylene | Ethylene/1-Butene | Ethylene |
| | Comonomer Content (wt %) | 5.2 | 5.2 | 5.2 | 4.6 | 5.1 | 3.8 | 4.1 | 2.4/3.7 | 5.2 |
| | Mw/Mn | 3.3 | 2.8 | 2.7 | — | 1.9 | 2.1 | 5.4 | 4.6 | — |
| | MFR (g/10 min) | 12 | 17 | 24 | 16 | 12 | 20 | 7 | 7 | 10 |
| | Homo PP Content (wt %) | 15 | 15 | 15 | 25 | 0 | 0 | 0 | 0 | 15 |
| | Lowest Peak Temp. (° C.) | 106 | 104 | 106 | 107 | 107 | 114 | — | — | 110 |
| | Intermediate Peak Temp. (° C.) | 131 | 132 | 132 | 131 | — | — | — | — | — |
| | Highest Peak Temp. (° C.) | 146 | 146 | 146 | 147 | 119 | 126 | — | — | 164 |
| | Single Peak Temp. (° C.) | — | — | — | — | — | — | 134 | 133 | — |
| Expanded particles | Foaming Agent | $CO_2$ | $CO_2$ | $CO_2$ | $CO_2$ | $CO_2$ | $CO_2$ | $CO_2$ | $CO_2$ | $CO_2$ |
| | Foaming Temp. (° C.) | 134 | 133 | 133 | 133 | 135 | 127 | 136 | 136 | 153 |

TABLE 1-continued

| | | Example 1 | Example 2 | Example 3 | Example 4 | COEX 1 | COEX 2 | COEX 3 | COEX 4 | COEX 5 |
|---|---|---|---|---|---|---|---|---|---|---|
| | First-stage Foaming Ratio (Time) | 11 | 13 | 14 | 14 | 9 | 12 | 11 | 10 | 11 |
| | DSC Ratio of First-stage Foaming Particles (%) | 29 | 26 | 26 | 26 | 20 | 20 | 28 | 26 | 28 |
| | High Peak Temp. | 146 | 146 | 142 | 151 | 129 | 138 | 150 | 144 | 165 |
| | Low Peak Temp. | 110 | 110 | 109 | 112 | 109 | 120 | 129 | 125 | 110 |
| | Difference Between High and Low Peak Temp. (° C.) | 36 | 36 | 34 | 39 | 20 | 18 | 21 | 19 | 55 |
| | Second-stage Foaming Ratio (Time) | 27 | 28 | 28 | 28 | 28 | 28 | 29 | 28 | 28 |
| | Average Cell Diameter of Second-stage Expanded particles (μm) | 258 | 264 | 240 | 212 | 164 | 218 | 243 | 276 | 124* |
| | Cell Structure Of Second-stage Expanded particles | uniform | uniform | uniform | uniform | uniform | uniform | uniform | uniform | un□uniform |
| In-mold foaming molded product | Density of In-mold foaming molded product (g/L) | 21 | 20 | 20 | 20 | 20 | 20 | 20 | 20 | 20 |
| | 50% Compressive Strength of In-mold foaming molded product | ○ | ○ | ○ | ○ | x | ○ | ○ | ○ | x |
| | Lowest Molding Heating Steam Pressure (MPa · G) | 0.12 | 0.12 | 0.12 | 0.15 | 0.12 | 0.18 | 0.22 | 0.24 | 0.15 |
| | Highest Molding Heating Steam Pressure (MPa · G) | 0.26 | 0.26 | 0.24 | 0.28 | 0.14 | 0.22 | 0.28 | 0.3 | 0.18 |
| | Range Of Heating Condition for Molding (MPa · G) | 0.14 | 0.14 | 0.12 | 0.13 | 0.02 | 0.04 | 0.06 | 0.06 | 0.03 |
| | Evaluation of Range of Heating Condition for Molding | ○ | ○ | ○ | ○ | x | x | Δ | Δ | x |

*A cell structure of second-stage expanded particles in comparative example 5 is a cell structure in which coarse cells (300-600 mm) are dispersed in a fine cell.
Abbreviations:
COEX stands for Comparative Example
Meta. stands for Metallocene Example 2

A propylene-ethylene random copolymer was obtained in the same way as Example 1, except for the followings: in polymerization (5) of <Production of propylene-ethylene random copolymer using a metallocene polymerization catalyst> according to Example 1, (i) hydrogen was supplied into a polymerization vessel (capacity: 1000 L) so that concentration of hydrogen became 0.45% by mol in a gas phase section and (ii) hydrogen was supplied into a polymerization vessel (capacity: 500 L) so that concentration of hydrogen became 0.45% by mol in a gas phase section.

The propylene-ethylene random copolymer thus obtained had ethylene content of 5.2% by weight and polypropylene homopolymer content of 15% by weight, and a lowest melting peak temperature and a highest melting peak temperature which were obtained by the measurements of the melting points using the differential scanning calorimeter were 104° C. and 146° C., respectively, and MFR was 17 g/10 min.

Resin particles, expanded particles, and an in-mold foaming molded product were obtained in the same way as Example 1, except that the propylene-ethylene random copolymer was used. The in-mold foaming molded product was evaluated and the result is indicated in Table 1.

Example 3

A propylene-ethylene random copolymer was obtained in the same way as Example 1, except for the followings: in polymerization (5) of <Production of propylene-ethylene random copolymer using a metallocene polymerization catalyst> according to Example 1, (i) hydrogen was supplied into a polymerization vessel (capacity: 1000 L) so that concentration of hydrogen became 0.52% by mol in a gas phase section and (ii) hydrogen was supplied into a polymerization vessel (capacity: 500 L) so that concentration of hydrogen became 0.52% by mol in a gas phase section.

The propylene-ethylene random copolymer thus obtained had ethylene content of 5.2% by weight and polypropylene homopolymer content of 15% by weight, and a lowest melting peak temperature and a highest melting peak temperature which were obtained by the measurements of the melting points using the differential scanning calorimeter were 106° C. and 146° C., respectively, and MFR was 24 g/10 min.

Resin particles, expanded particles, and an in-mold foaming molded product were obtained in the same way as Example 1, except that the propylene-ethylene random copolymer was used. The in-mold foaming molded product was evaluated and the result is indicated in Table 1.

Example 4

A propylene-ethylene random copolymer was obtained in the same way as Example 1, except for the followings: in polymerization (5) of <Production of propylene-ethylene random copolymer using a metallocene polymerization catalyst> according to Example 1, (i) ethylene at a rate of 1.4 kg/hr was supplied into a polymerization vessel (capacity: 1000 L) and hydrogen was also supplied into it so that concentration of hydrogen became 0.44% by mol in a gas phase section and (ii) ethylene at a rate of 1.0 kg/hr was supplied into a polymerization vessel (capacity: 500 L) and hydrogen was also supplied into it so that concentration of hydrogen became 0.44% by mol in a gas phase section.

The propylene-ethylene random copolymer thus obtained had ethylene content of 4.6% by weight and polypropylene homopolymer content of 25% by weight, and a lowest melting peak temperature and a highest melting peak temperature which were obtained by the measurements of the melting points using the differential scanning calorimeter were 107° C. and 147° C., respectively, and MFR was 16 g/10 min.

Resin particles, expanded particles, and an in-mold foaming molded product were obtained in the same way as Example 1, except that the propylene-ethylene random copolymer was used. The in-mold foaming molded product was evaluated and the result is indicated in Table 1.

Comparative Example 1

A propylene-ethylene random copolymer was obtained in the same way as Example 1, except for the followings: the pre-polymerization P-2 (4) of <Production of propylene-ethylene random copolymer using a metallocene polymerization catalyst> according to Example 1 was not carried out; and, in polymerization (5), (i) ethylene at a rate of 1.6 kg/hr was supplied into a polymerization vessel (capacity: 1000 L) and hydrogen was also supplied into it so that concentration of hydrogen became 0.31% by mol in a gas phase section and (ii) ethylene at a rate of 1.1 kg/hr was supplied into a polymerization vessel (capacity: 500 L) and hydrogen was also supplied into it so that concentration of hydrogen became 0.31% by mol in a gas phase section.

The propylene-ethylene random copolymer thus obtained had ethylene content of 5.1% by weight, no polypropylene homopolymer, a lowest melting peak temperature obtained by the measurement of the melting point using the differential scanning calorimeter were 107° C., and MFR was 7 g/10 min.

Resin particles, expanded particles, and an in-mold foaming molded product were obtained in the same way as Example 1, except that the propylene-ethylene random copolymer was used. The in-mold foaming molded product was evaluated and the result is indicated in Table 1.

Comparative Example 2

A propylene-ethylene random copolymer was obtained in the same way as Example 1, except for the followings: the pre-polymerization P-2 (4) of <Production of propylene-ethylene random copolymer using a metallocene polymerization catalyst> according to Example 1 was not carried out; and, in polymerization (5), (i) ethylene at a rate of 1.2 kg/hr was supplied into a polymerization vessel (capacity: 1000 L) and hydrogen was also supplied into it so that concentration of hydrogen became 0.48% by mol in a gas phase section and (ii) ethylene at a rate of 0.8 kg/hr was supplied into a polymerization vessel (capacity: 500 L) and hydrogen was also supplied into it so that concentration of hydrogen became 0.48% by mol in a gas phase section.

The propylene-ethylene random copolymer thus obtained had ethylene content of 3.8% by weight, no polypropylene homopolymer, a lowest melting peak temperature obtained by the measurement of the melting point using the differential scanning calorimeter were 114° C., and MFR was 20 g/10 min.

Resin particles, expanded particles, and an in-mold foaming molded product were obtained in the same way as Example 1, except that the propylene-ethylene random copolymer was used. The in-mold foaming molded product was evaluated and the result is indicated in Table 1.

Comparative Example 3

Resin particles, expanded particles, and an in-mold foaming molded product were obtained in the same way as Example 1, except that propylene-ethylene random copolymer (F744NP, produced by Prime Polymer Co., Ltd.) (ethylene content is 4.1% by weight; a single lowest melting peak temperature obtained by the measurement of the melting point using the differential scanning calorimeter is 134° C.; and MFR is 7 g/10 min) which had been polymerized using a Ziegler polymerization catalyst was used as a polypropylene resin. The result is indicated in Table 1.

Comparative Example 4

Resin particles, expanded particles, and an in-mold foaming molded product were obtained in the same way as Example 1, except that a propylene-ethylene.1-butene random copolymer (ethylene content is 2.4% by weight; 1-butene content is 3.7% by weight; a single lowest melting peak temperature obtained by the measurement of the melting point using the differential scanning calorimeter is 133° C.; and MFR is 7 g/10 min) (F337D, produced by Prime Polymer Co., Ltd.) which had been polymerized using a Ziegler polymerization catalyst was used as a polypropylene resin. The in-mold foaming molded product was evaluated and the result is indicated in Table 1.

In Examples 1 to 4, lowest mold heating steam pressures were 0.12 MPa·G to 0.15 MPa·G, which were as extremely low as a mold heating steam pressure of polyethylene resin, and ranges of heating condition for molding were wide (0.10 MPa·G or more). On the contrary, in Comparative Examples 1 and 2, lowest mold heating steam pressures were low (0.12 MPa·G and 0.18 MPa·G, respectively), however, ranges of heating condition for molding were narrow (0.02 MPa·G and 0.04 MPa·G, respectively). In Comparative Examples 3 and 4 using a Ziegler polymerization catalyst, melting points were 133° C. to 134° C., which were low for the resin polymerized using a Ziegler polymerization catalyst, however, lowest mold heating steam pressures were high (0.22 MPa·G to 0.24 MPa·G), and ranges of heating condition for molding were evaluated as Δ (0.06 MPa·G).

Comparative Example 5

Resin particles, expanded particles, and an in-mold foaming molded product were obtained in the same way as Example 1, except that a polypropylene resin obtained by the following steps was used: (i) 85% by weight of the propylene-ethylene random copolymer polymerized using a metallocene catalyst used in Comparative Example 1 and 15% by weight of polypropylene homopolymer (F113G (melting point of 165° C.; MFR of 4.0 g/10 min) produced by Prime Polymer Co., Ltd.) polymerized using a Ziegler polymerization catalyst were blended to each other and (ii) the mixture thus obtained was melted and kneaded using a twin-screw extruder [TEK-45, produced by O.N.MACHINERY CO., LTD.] at a resin temperature of 200° C. to 220° C. The in-mold foaming molded product was evaluated and the result is indicated in Table 1.

The expanded particles thus obtained had a ununiform cell structure, and an open cell ratio was high (14.5%) (normally, less than about 5%). In in-mold foaming molding, the lowest mold heating steam pressure was low (0.15 MPa·G). However, when the mold heating steam pressure was increased, the expanded particles were distorted and deformed largely, shrank largely, and the range of heating condition for molding was extremely narrow.

The invention claimed is:

1. Polypropylene resin expanded particles, comprising:
a polypropylene resin as a base material resin which has at least three melting peaks on a DSC curve obtained by measurements of melting points with use of a differential scanning calorimeter, the DSC curve being obtained in a second temperature rise in raising a temperature of the polypropylene resin from 20° C. to 220° C. at a heating rate of 10° C./min, lowering the temperature from 220° C. to 20° C. at a cooling rate of 10° C./min, and raising the temperature again from 20° C. to 220° C. at a heating rate of 10° C./min, the at least three melting peaks including (i) a lowest-temperature melting peak of 100° C. or more but 130° C. or less and (ii) a highest-temperature melting peak of 140° C. or more but 160° C. or less.

2. The polypropylene resin expanded particles as set forth in claim 1,
wherein the at least three melting peaks include (i) the lowest-temperature melting peak, (ii) the highest-temperature melting peak, and (iii) a melting peak between the lowest-temperature melting peak and the highest-temperature melting peak.

3. The polypropylene resin expanded particles as set forth in claim 1, wherein the lowest-temperature melting peak derived from a polypropylene resin polymerized by using a metallocene polymerization catalyst.

4. The polypropylene resin expanded particles as set forth in claim 3,
wherein the lowest-temperature melting peak and the highest-temperature melting peak are derived from the polypropylene resin polymerized by using the metallocene polymerization catalyst.

5. The polypropylene resin expanded particles as set forth in claim 3,
wherein the metallocene polymerization catalyst contains a metallocene compound represented by the following Formula 1:

where $R^1, R^2, R^3, R^4, R^5, R^6, R^7, R^8, R^9, R^{10}, R^{11}, R^{12}, R^{13}$, and $R^{14}$ identically or independently one selected from the group consisting of a hydrogen atom, a hydrocarbon group, and a silicon-containing group; M represents a group-4 transition metal; Y represents a carbon atom or a silicon atom; Q is identically or independently one selected from the group consisting of a halogen atom, a hydrocarbon group, an anion ligand, and a neutral ligand coordinatable with a lone pair of electrons; and j is an integer of 1 to 4.

6. The polypropylene resin expanded particles as set forth in claim 1,
wherein the polypropylene resin expanded particles have at least two melting peaks on the DSC curve obtained in first measurement of temperature rise of the polypropylene resin expanded particles with use of a differential scanning calorimeter, the at least two melting peaks including (i) a lowest-temperature melting peak of 100° C. or more but 130° C. or less and (ii) a highest-temperature melting peak of 140° C. or more but 160° C. or less.

7. The polypropylene resin expanded particles as set forth in claim 6,
wherein a difference between the temperature of the lowest-temperature melting peak and the temperature of the highest-temperature melting peak is 25° C. or more but 40° C. or less.

8. A polypropylene resin in-mold foaming molded product prepared from the polypropylene resin expanded particles as set forth in claim 1 by in-mold foaming molding.

9. A method for producing polypropylene resin expanded particles, comprising the steps of:
dispersing polypropylene resin particles together with a dispersant in water in a presence of a foaming agent in a vessel, the polypropylene resin particles containing a polypropylene resin as a base material resin, the polypropylene resin having at least three melting peaks on a DSC curve obtained by measurements of melting points with use of a differential scanning calorimeter, the at least three melting peaks including (i) a lowest-temperature melting peak of 100° C. or more but 130° C. or less and (ii) a highest-temperature melting peak of 140° C. or more but 160° C. or less;
heating the polypropylene resin particles to a foaming temperature under pressure, and impregnating the foaming agent to the polypropylene resin particles; and thereafter
releasing and foaming a dispersion substance including the polypropylene resin particles in the vessel to a low pressure area while keeping a temperature and pressure in the vessel constant, so that the polypropylene resin expanded particles are obtained, wherein
the polypropylene resin expanded particles, comprising:
a polypropylene resin as a base material resin which has at least three melting peaks on a DSC curve obtained by measurements of melting points with use of a differential scanning calorimeter, the DSC curve being obtained in a second temperature rise in raising a temperature of the polypropylene resin from 20° C. to 220° C. at a heating rate of 10° C./min, lowering the temperature from 220° C. to 20° C. at a cooling rate of 10° C./min, and raising the temperature again from 20° C. to 220° C. at a heating rate of 10° C./min, the at least three melting peaks including (i) a lowest-temperature melting peak of 100° C. or more but 130° C. or less and (ii) a highest-temperature melting peak of 140° C. or more but 160° C. or less.

10. A method for producing a polypropylene resin in-mold foaming molded product, comprising the step of in-mold foaming molding the polypropylene resin expanded particles produced by the method as set forth in claim 9.

11. A method for producing polypropylene resin expanded particles, comprising the steps of:
dispersing polypropylene resin particles together with a dispersant in water in a presence of a foaming agent in a vessel, the polypropylene resin particles containing a polypropylene resin as a base material resin, the polypropylene resin being obtained by means of multi-stage polymerization and having at least three melting peaks on a DSC curve obtained by measurements of melting points with use of a differential scanning calorimeter, the at least two melting peaks including (i) a lowest-temperature melting peak of 100° C. or more but 130° C. or less and (ii) a highest-temperature melting peak of 140° C. or more but 160° C. or less;
heating the polypropylene resin particles to a foaming temperature under pressure, and impregnating the foaming agent to the polypropylene resin particles; and thereafter
releasing and foaming a dispersion substance including the polypropylene resin particles in the vessel to a low pressure area while keeping a temperature and pressure in the vessel constantly, so that the polypropylene resin expanded particles are obtained, wherein
the polypropylene resin expanded particles, comprising:
a polypropylene resin as a base material resin which has at least three melting peaks on a DSC curve obtained by measurements of melting points with use of a differential scanning calorimeter, the DSC curve being obtained in a second temperature rise in raising a temperature of the polypropylene resin from 20° C. to 220° C. at a heating rate of 10° C./min, lowering the temperature from 220° C. to 20° C. at a cooling rate of 10° C./min, and raising the temperature again from 20° C. to 220° C. at a heating rate of 10° C./min, the at least three melting peaks including (i) a lowest-temperature melting peak of 100° C. or more but 130° C. or less and (ii) a highest-temperature melting peak of 140° C. or more but 160° C. or less.

12. The method as set forth in claim 11, wherein the multi-stage polymerization is performed by using a metallocene catalyst.

* * * * *